United States Patent

Yamawaki

(10) Patent No.: US 7,813,359 B1
(45) Date of Patent: Oct. 12, 2010

(54) COMMUNICATION GATEWAY

(75) Inventor: Toshio Yamawaki, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 0 days.

(21) Appl. No.: 09/530,145

(22) PCT Filed: Oct. 19, 1998

(86) PCT No.: PCT/JP98/04702

§ 371 (c)(1),
(2), (4) Date: Apr. 24, 2000

(87) PCT Pub. No.: WO99/22494

PCT Pub. Date: May 6, 1999

(30) Foreign Application Priority Data

Oct. 24, 1997 (JP) .................................. 9-292909

(51) Int. Cl.
*H04L 12/28* (2006.01)
(52) U.S. Cl. ...................................................... 370/402
(58) Field of Classification Search ................ 370/401, 370/402, 389, 392, 395.31, 395.41, 395.52, 370/432, 471, 466, 474, 467, 488, 497, 902, 370/469, 403, 352, 356, 408, 400, 397, 396, 370/398, 399, 410; 709/223, 311, 238, 227, 709/230; 713/153
See application file for complete search history.

(56) References Cited

U.S. PATENT DOCUMENTS

| | | | |
|---|---|---|---|
| 5,379,292 A | 1/1995 | Kurata et al. | |
| 5,386,470 A | 1/1995 | Carter et al. | |
| 5,570,366 A * | 10/1996 | Baker et al. | 370/312 |
| 5,588,002 A | 12/1996 | Kawanishi et al. | |
| 5,640,400 A * | 6/1997 | Sato et al. | 370/401 |

(Continued)

FOREIGN PATENT DOCUMENTS

JP          3-283842          12/1991

(Continued)

OTHER PUBLICATIONS

T. Schmid et al., "C0167CR Bringt Gateway-Funktionalitat in den Bordrenchner" SIEMENS, Components, vol. 35, No. 5/6, 1997, pp. 44-45.

(Continued)

*Primary Examiner*—Chi H Pham
*Assistant Examiner*—Alexander Boakye
(74) *Attorney, Agent, or Firm*—Christie, Parker & Hale, LLP.

(57) ABSTRACT

A gateway device is disclosed which processes only really necessary information for gatewaying and thereby prevents unnecessary increases in communication traffic on a communication bus to which data is sent through the gatewaying. When it is judged that the contents of received data concern a command that does not need gatewaying, the processing for gatewaying is inhibited. When it is judged that the contents of the received data show information that should be processed for gatewaying only when there is a change in the contents, the contents are compared with the latest contents of the same kind of information stored in a memory, to determine whether there is a change in the contents, and the processing for gatewaying is inhibited when it is determined that there is no change.

17 Claims, 6 Drawing Sheets

U.S. PATENT DOCUMENTS

| | | | |
|---|---|---|---|
| 5,856,976 A | | 1/1999 | Hirano |
| 5,933,605 A | * | 8/1999 | Kawano et al. ............. 709/238 |
| 6,523,696 B1 | * | 2/2003 | Saito et al. ................. 709/223 |

FOREIGN PATENT DOCUMENTS

| | | |
|---|---|---|
| JP | 5-14353 | 1/1993 |
| JP | 7-046665 | 2/1995 |
| JP | 7-210473 | 8/1995 |

OTHER PUBLICATIONS

European Patent Office Action, dated May 5, 2004, for corresponding EPO Application No. 98 947 922.5.

Office action dated Nov. 14, 2008 for European Patent Application No. 04 020 416.6, 6 pages, indicating relevance of cited references.

Honeywell: "Smart Standard" [Online] Jun. 1997, pp. 1-8, Retrieved from the Internet: URL:http://content.honeywell.com/sensing/prodinfo/sds/smartstandard/june97p0.pdf>.

Computing & Control Engineering Journal, [Online] Aug. 1997, pp. 188-192, Retrieved from the Internet: URL:http://ieeexplore.ieee.org/iel1/2218/13399/x0147795.pdf> [retrieved on Oct. 2, 2008].

"Proceedings of the 4th iCC 1997", [Online] 1997, pp. 1-3, Retrieved from the Internet: URL:http://www.can-cia.org/index.php?id=76> [retrieved on Oct. 3, 2008].

European Search Report for corresponding EP 04 02 0416.6, dated Feb. 2, 2006, in the name of Fujitsu Ten Limited.

Eltze, J, *Double-CAN Controller as Bridge for Different CAN Networks*, Fourth ICC Conference, 1997, 8 pages, XP002363560.

* cited by examiner

| COMMAND CODE (HEX) | COMMAND TYPE | STORED FLAG |
|---|---|---|
| ⋮ | ⋮ | ⋮ |
| "05" (OUTSIDE TEMPERATURE) | 1 | 1 |
| ⋮ | ⋮ | ⋮ |
| "1F" (ENGINE RPM) | 0 | 0 |
| ⋮ | ⋮ | ⋮ |
| "B3" (DISTANCE-TO-EMPTY) | 2 | 1 |
| ⋮ | ⋮ | ⋮ |
| "DE" (INSTANTANEOUS FUEL ECONOMY) | 2 | 0 |
| ⋮ | ⋮ | ⋮ |

COMMUNICATION GATEWAY

TECHNICAL FIELD

The present invention relates to a gateway device that interconnects two communication buses implemented with different communication methods.

BACKGROUND ART

In recent years, in automobiles and other applications, two or more dissimilar communication buses, each handling unique control information, are used. When there is a need to exchange information between one communication bus and another, a gateway device is provided through which the two buses, implemented with different communication methods, are interconnected.

When two communication buses are interconnected via a gateway device as described above, the amount of communication traffic on each communication bus increases because information on one communication bus is transmitted to the other communication bus and vice versa. To suppress such an increase in communication traffic, some prior art gateway devices employ techniques of information filtering using physical addresses or logical addresses, but in that case, information associated with the same address is all transferred to the other communication bus.

Accordingly, with such prior art gateway devices, if only part of information is needed on the communication bus at the receiving side, all information destined for its address is processed for gatewaying into the receiving communication bus. This increases the communication traffic since unnecessary portions of the information are also transferred.

Furthermore, in configurations where periodically occurring information is processed for gatewaying regardless of whether there occurs a change in its contents, the amount of communication traffic also increases because unnecessary information whose contents remain unchanged is also transferred when only information representing the latest change is needed on the receiving communication bus.

DISCLOSURE OF THE INVENTION

In view of the above problem, it is an object of the present invention to provide a gateway device that processes only really necessary information for gatewaying and thereby avoids unnecessary increases in communication traffic on the communication bus at the receiving side.

To achieve the above object, according to the present invention, there is provided a gateway device, which interconnects two communication buses implemented with different communication methods, comprising: judging means for judging whether or not information received from one communication bus is information that should be transmitted to the other communication bus; and filtering means for transmitting the received information to the other communication bus only when the received information is judged by the judging means to be the information that should be transmitted.

According to the present invention, there is also provided a method of gatewaying, in a gateway device which interconnects two communication buses implemented with different communication methods, comprising the steps of: (a) judging whether or not information received from one communication bus is information that should be transmitted to the other communication bus; and (b) performing filtering to transmit the received information to the other communication bus only when in the step (a) the received information is judged to be the information that should be transmitted.

BEST MODE FOR CARRYING OUT THE INVENTION

An embodiment of the present invention will be described below with reference to the accompanying drawings.

Figure 1:
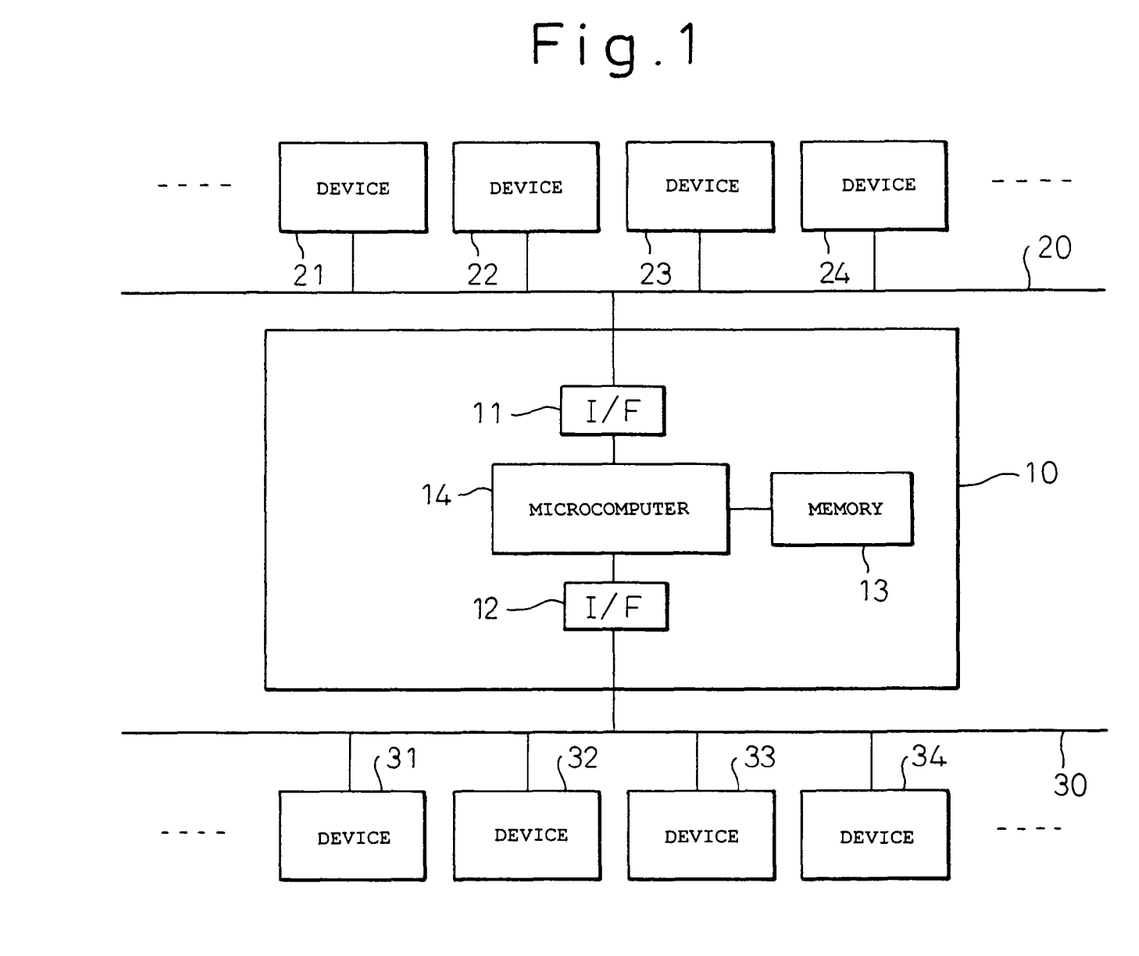
FIG. 1 is a block diagram showing interconnections between a gateway device, according to the present invention, two communication buses connected by the gateway device, and devices connected to the respective communication buses.

FIG. 1 is a block diagram showing interconnections between a gateway device 10 according to the present invention, two communication buses 20 and 30 connected by the gateway device, and devices connected to the respective communication buses. The devices 21, 22, 23, 24, etc. connected to the communication bus A as the first communication bus 20 perform communications with one another in accordance with a communication protocol A (a set of communication rules) as a first communication method. Likewise, the devices 31, 32, 33, 34, etc. connected to the communication bus B as the second communication bus 30 perform communications with one another in accordance with a communication protocol B as a second communication method.

The gateway device 10, which interconnects the communication bus A 20 and the communication bus B 30, comprises an interface 11 for interfacing with the communication bus A, an interface 12 for interfacing with the communication bus B, a memory 13, and a microcomputer 14, and accomplishes the function of receiving data from one communication bus and transmitting the data to the other communication bus by performing protocol conversion.

The embodiment here specifically assumes the case in which the invention is applied to an automobile, and the communication bus A 20 is configured as a bus that uses a protocol intended for data communications between vehicle body-related control devices, while the communication bus B 30 is configured as a bus that uses a protocol intended for data communications between status information-related control devices. An engine ECU (electronic control unit) as the device 21, an air-conditioner ECU as the device 22, a meter ECU as the device 23, etc. are connected to the communication bus A 20. To the communication bus B 30 are connected a display ECU as the device 31, a navigation ECU as the device 32, an audio ECU as the device 33, etc.

Figure 2:
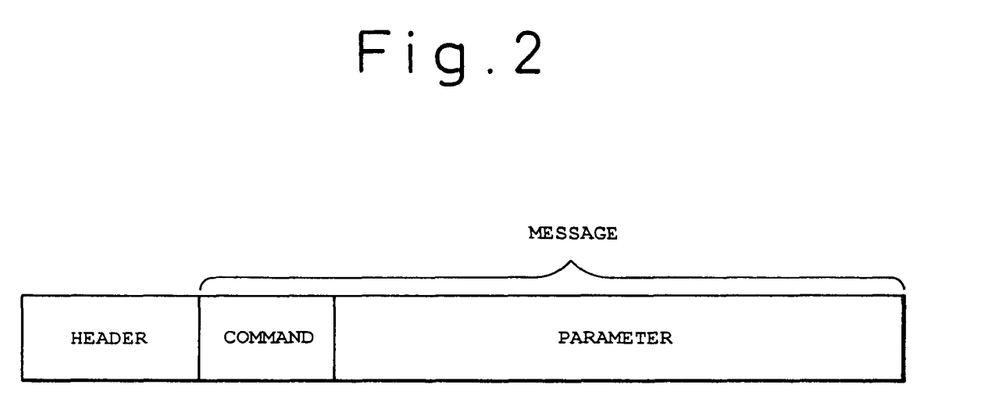
FIG. 2 is a diagram showing in simplified form the format of data transmitted on each communication bus.

FIG. 2 is a diagram showing in simplified form the format of data transmitted on each communication bus. As shown in the diagram, the data consists of a header and a message, and the message is made up of a command and a parameter accompanying the command. The command is expressed by a 1-byte code. The header contains an address, an attribute, etc. The data format on the communication bus A 20 and the data format on the communication bus B 30 are fundamentally the same as that shown in FIG. 2; however, the details differ between the two formats, and the conversion between them is accomplished by the gateway device 10.

Figure 3:
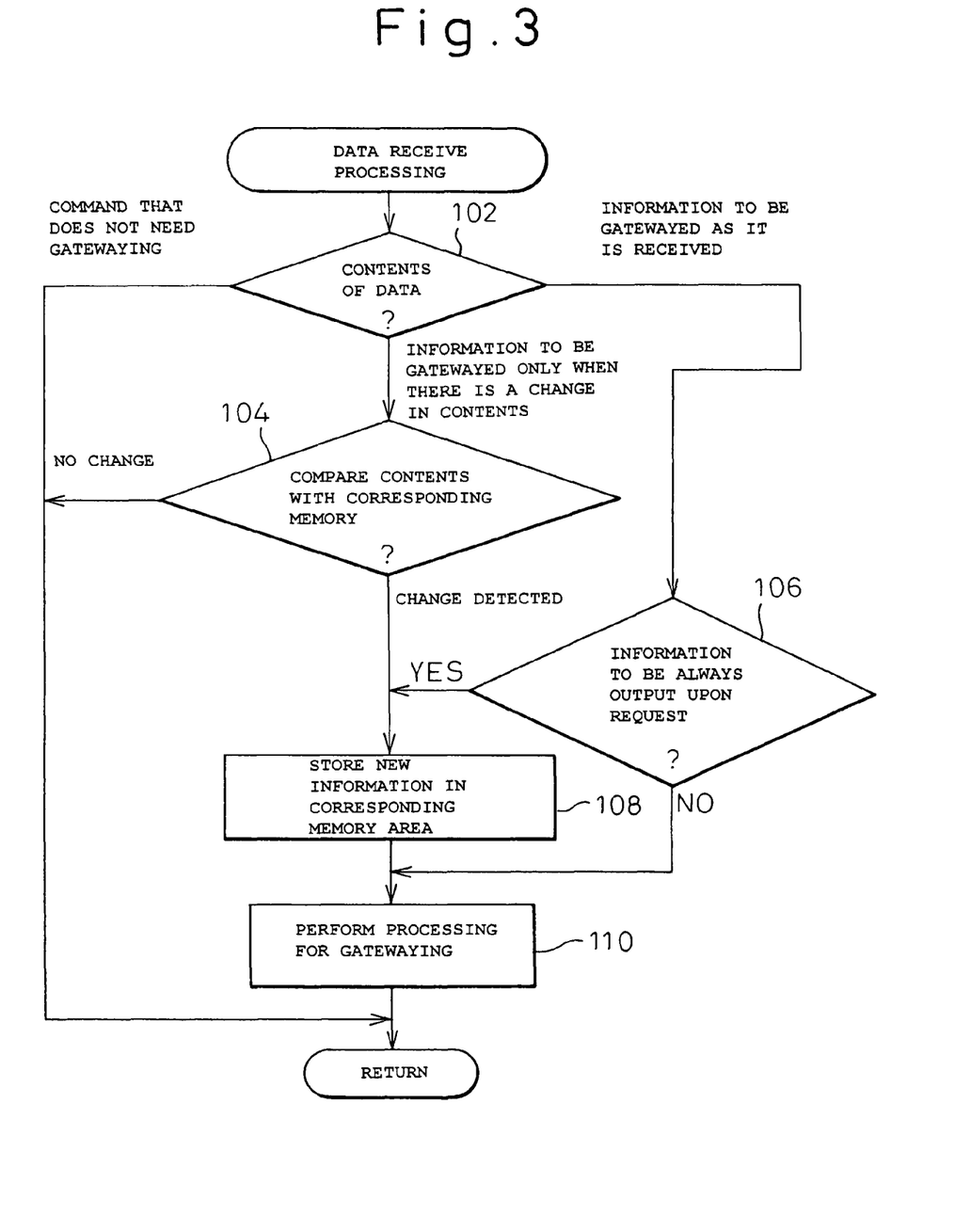
FIG. 3 is a flowchart illustrating the processing steps of a service routine that a control microcomputer within the gateway device carries out when data is received.
Figure 4:
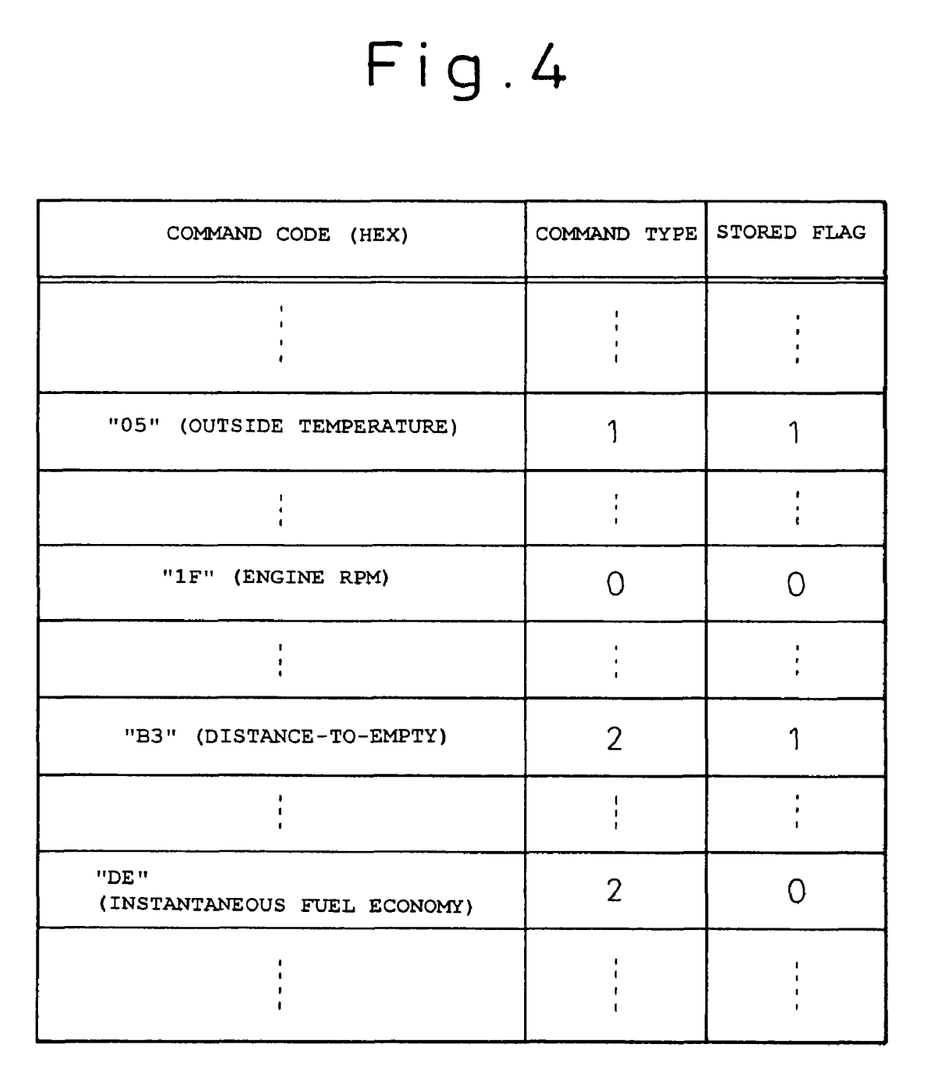
FIG. 4 is a diagram showing a table used to judge the contents of received data.
Figure 5:
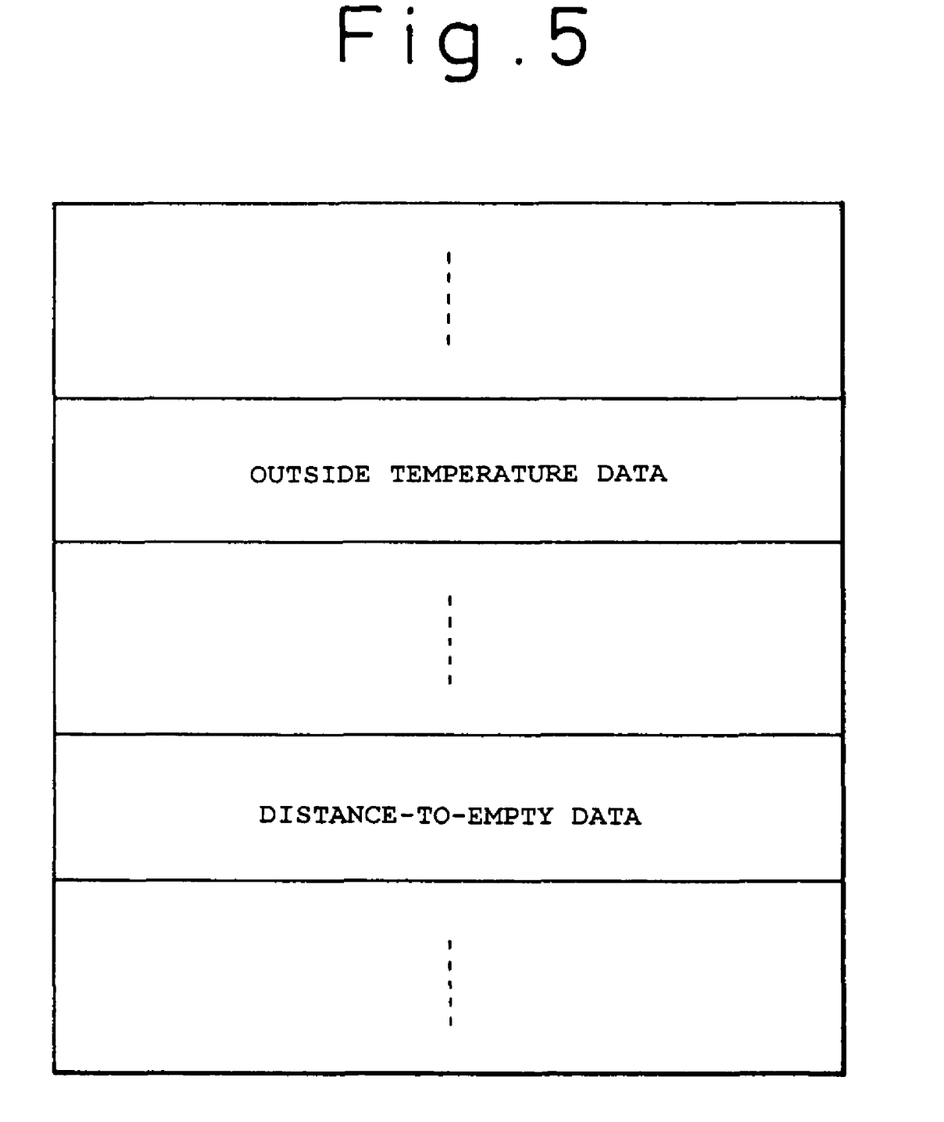
FIG. 5 is a diagram showing a table of stored information.

FIG. 3 is a flowchart illustrating the processing steps of a service routine that the control microcomputer 14 within the gateway device 10 carries out when data is received. FIGS. 4 and 5 are diagrams showing in schematic form the contents of tables held in the memory 13 and used during the processing of FIG. 3. This routine can be carried out not only when gatewaying from the communication bus A 20 to the communication bus B 30 but also when gatewaying from the communication bus B 30 to the communication bus A 20. The following description deals with the gatewaying from the communication bus A 20 to the communication bus B 30.

First, in step 102, the contents of the received data are examined to judge whether the data concerns a command that does not need gatewaying or information that should be gatewayed only when there is a change in the contents or as it is received, regardless of whether a change has occurred or not.

This judgement is made based on the command code contained in the data, and a table such as shown in Table 4 is prestored in the memory 13 for this purpose. The table has a column indicating the command type for each command code. For example, the engine ECU 21 periodically transmits an engine rpm display command expressed by a command code $(1F)_{16}$ (meaning the hexadecimal number 1F); this and other commands indicted by the command type "0" are commands that do not need gatewaying. On the other hand, the air-conditioner ECU 22 periodically transmits an outside temperature display command expressed by a command code $(05)_{16}$; this and other commands indicated by the command type "1" are commands that should be gatewayed only when there is a change in the contents. Further, the meter ECU 23 transmits a distance-to-empty display command expressed by a command code $(B3)_{16}$ and an instantaneous fuel economy display command expressed by a command code $(DE)_{16}$; these and other commands indicted by the command type "2" are commands that should be gatewayed as they are received, regardless of whether a change has occurred or not.

If it is judged in step 102 that the command is a command, such as the engine rpm display command, that does not need gatewaying, the routine is terminated without performing processing for gatewaying. This serves to prevent the increase in traffic that would occur on the data receiving communication bus if the processing for gatewaying were performed.

If it is judged in step 102 that the command is a command, such as the outside temperature display command, that should be gatewayed only when there is a change in data contents, the process proceeds to step 104. In step 104, a table such as shown in FIG. 5 is referenced. This table stores the latest data of information that should be stored. In step 104, the outside temperature data stored in the table, for example, is compared with the value of the outside temperature expressed by the currently received outside temperature display command, to determine whether there is a change in the contents. If it is determined that there is no change, the routine is terminated without performing processing for gatewaying. In this case also, the increase in traffic that would occur on the data receiving communication bus if the processing for gatewaying were performed can be prevented. On the other hand, if it is determined in step 104 that there is a change, the process proceeds to step 108 where the contents of the currently received data are stored as the latest data in the corresponding area of the table of FIG. 5. Then, the process proceeds to step 110 to perform processing for gatewaying.

If it is judged in step 102 that the contents of the data show information, such as the distance-to-empty display command or the instantaneous fuel economy display command, that should be gatewayed as it is received, the process proceeds to step 106. In step 106, it is judged whether the received data carries information that should always be output via the gateway upon a request from the communication bus. A stored flag column in the table of FIG. 4 is reference for this judgement. For example, a command whose stored flag is "1", like the distance-to-empty display command, is a command that should always be output via the gateway upon a request from the communication bus; on the other hand, a command whose stored flag is "0", like the instantaneous fuel economy display command, does not fall into the above command category. If the result of the judgement in step 106 is YES, the previously described storing processing of step 108 and the gateway processing of step 110 are carried out before terminating the routine. On the other hand, if the result of the judgement in step 106 is NO, only the gateway processing of step 110 is carried out before terminating the routine.

Figure 6:
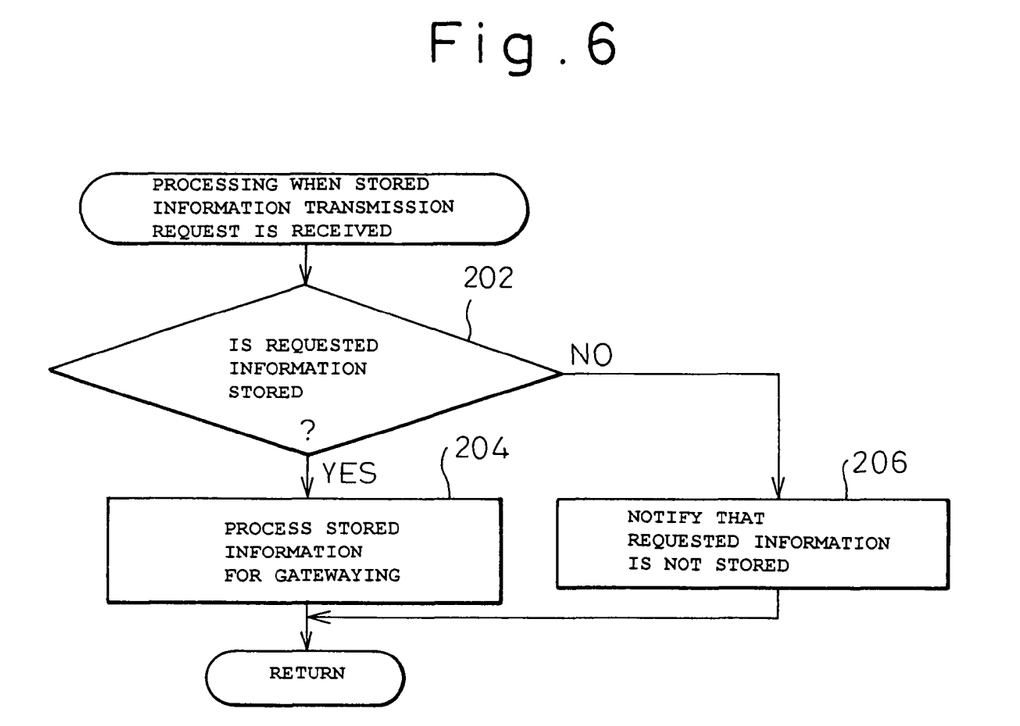
FIG. 6 is a flowchart illustrating the processing steps of a service routine that the control microcomputer within the gateway device carries out when a stored information transmission request is received.

FIG. 6 shows the processing steps of a service routine carried out by the control microcomputer 14 when the gateway device has received a stored information transmission request from the communication bus. First, in step 202, it is determined whether the requested information is stored in the stored information table (FIG. 5) within the memory 13. For example, when the result of the determination is YES, like the case when a request for the distance-to-empty data is made from the communication bus B 30, the process proceeds to step 204 where the requested stored information is processed for gatewaying to the requesting communication bus, after which the routine is terminated. On the other hand, when the result of the determination is NO, the process proceeds to step 206 to notify the requesting communication bus that the requested information is not stored in the stored information table (FIG. 5) within the memory 13, after which the routine is terminated.

In cases where a device connected to the receiving communication bus has failed to capture the information transmitted through the gateway or the information has been erased by a reset operation, etc., if the processing such as shown in FIG. 6 is provided there is no need to have the transmitting communication bus re-transmit the information, but the gateway information can be acquired from the gateway device any time.

Trial calculations were made to see how much the increase in traffic can be suppressed when the present invention is employed. First, it was assumed that the communication bus A has a transfer speed of 10 kbps, and that the bus usage by itself is 60% and the maximum allowable bus usage is set to 90%. It was also assumed that the communication bus B has a transfer speed of 17 kbps, and that the bus usage by itself is 30% and the maximum allowable bus usage is set to 40%.

Considering the case where the communication buses A and B are interconnected and gatewaying is performed from the communication bus A to the communication bus B, it is assumed that the gatewaying entails a factor of 1.7 increase in loss because of the addition of additional information, etc. associated with protocol conversion.

Supposing that 20% of the information on the communication bus A flows into the communication bus B by the gatewaying of the prior art, the bus usage on the communication bus B rises to $$30\% + 60\% \times 20\% \times 1.7 = 50.4\%$$

and thus cannot be held within the maximum allowable bus usage 40% for the communication bus B. On the other hand, supposing that the percentage of the information on the communication bus A that flows into the communication bus B is held down to 5% because of the filtering effect of the gateway device according to the present invention, the bus usage on the communication bus B is then

30%+60%×5%×1.7=35.1% and can thus be held below the maximum allowable bus usage 40% for the communication bus B.

As described above, according to the present invention, by processing only really necessary information for gatewaying, it becomes possible to prevent unnecessary increases in communication traffic on the communication bus to which the data is sent through the gateway.

What is claimed is:

1. A gateway device which interconnects one communication bus to another communication bus, the communication buses being implemented with different communication methods, and in which information to be communicated via the one communication bus is made up of a header field including an address specifying a destination in the one communication bus for the information, and a message field including information to be used at a receiving side after the communication based on said header field is completed, said gateway device comprising:
 a memory; and
 a microcomputer coupled to the memory, the microcomputer operable to execute computer program instructions, the computer program instructions including:
  judging, based on contents of said message field, whether or not the information received from the one communication bus is information that should be transmitted to the other communication bus; and
  transmitting said received information to said other communication bus when said received information is judged to be the information that should be transmitted.

2. A gateway device which interconnects one communication bus to another communication bus, the communication buses being implemented with different communication methods, and in which information to be communicated via the one communication bus is made up of a header field including an address specifying a destination in the one communication bus for the information, and a message field including a command and an associated parameter, said gateway device comprising:
 a memory; and
 a microcomputer coupled to the memory, the microcomputer operable to execute computer program instructions, the computer program instructions including:
  judging, based on said command, whether or not the information received from the one communication bus is information that should be transmitted to the other communication bus; and
  transmitting said received information to said other communication bus when said received information is judged to be information that should be transmitted.

3. A gateway device which interconnects one communication bus to another communication bus, the communication buses being implemented with different communication methods, comprising:
 a memory; and
 a microcomputer coupled to the memory, the microcomputer operable to execute computer program instructions, the computer program instructions including:
  judging whether or not information received from one communication bus is information that should be transmitted to the other communication bus;
  storing in the memory latest information judged to be information that should be transmitted;
  comparing the latest information stored in said memory with the received information that is judged to be information that should be transmitted and, when the latest information differs in content from the received information, transmitting said received information to said other communication bus and updating the latest information stored in said memory with said received information.

4. A gateway device as claimed in claim 3, wherein the program instructions further include:
 transmitting the information stored in said memory to a requesting communication bus in accordance with a request made from said requesting communication bus.

5. A gateway device as claimed in any one of claims 1 to 4 wherein said gateway device interconnects the one communication bus to the other communication bus in an automobile.

6. A method of gatewaying in a gateway device which interconnects two communication buses implemented with different communication methods, and in which information to be communicated via one communication bus is made up of a header field including an address specifying a destination in the one communication bus for the information, and a message field including information to be used at a receiving side after the communication based on said header field is completed, said method of gatewaying comprising the steps of:
 (a) judging, by a microcomputer, based on contents of the message field of said communicated information, whether or not the information received from the one communication bus is the information that should be transmitted to the other communication bus; and
 (b) performing filtering, by the microcomputer, to transmit said received information to said other communication bus when in said step (a) said received information is judged to be the information that should be transmitted.

7. A method of gatewaying in a gateway device which interconnects two communication buses implemented with different communication methods, and in which information to be communicated via one communication bus is made up of a header field containing information including an address specifying a destination in the one communication bus for the information, and a message field including a command and an associated parameter, said method of gatewaying comprising the steps of:
 (a) judging, by a microcomputer, based on the command contained in the message field of said communicated information, whether or not the information received from one communication bus is the information that should be transmitted to the other communication bus; and
 (b) performing filtering, by the microcomputer, to transmit said received information to said other communication bus when in said step (a) said received information is judged to be the information that should be transmitted.

8. A method of gatewaying in a gateway device which interconnects two communication buses implemented with different communication methods, comprising the steps of:

(a) judging by a microcomputer whether or not information received from one communication bus is information that should be transmitted to the other communication bus;
(b) storing by the microcomputer the information that is judged in said step (a) to be the information that should be transmitted; and
(c) performing filtering by the microcomputer whereby the information stored in said step (b) is compared with newly received information which is of the same kind as said stored information and is judged in said step (a) to be the information that should be transmitted and, when their contents differ, said received information is transmitted to said other communication bus while, at the same time, storing said received information in said step (b).

9. A method of gatewaying as claimed in claim 8, further comprising the step of:
(d) transmitting by the microcomputer the information stored in said step (b) to said other communication bus in accordance with a request made from said other communication bus.

10. The gateway device of claim 1, wherein the contents of the message field is payload information.

11. The gateway device of claim 3, wherein the information is payload information.

12. The method of claim 6, wherein the contents of the message field is payload information.

13. The method of claim 8, wherein the information is payload information.

14. The gateway device of claim 1 or 2, wherein the header field includes information specifying a destination address.

15. The method of claim 6 or 7, wherein the header field includes information specifying a destination address.

16. The gateway device of claim 1 or 2, wherein the header field includes an address specifying a destination in the one communication bus.

17. The method of claim 6 or 7, wherein the header field includes an address specifying a destination in the one communication bus.

* * * * *